Figure 1:
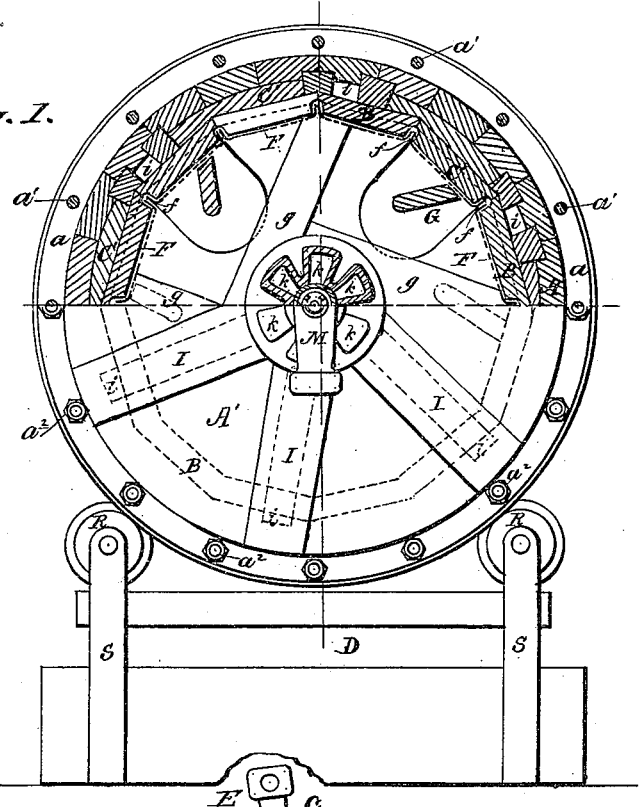

(No Model.)

J. F. N. MACAY.
FILTER.

No. 248,768. Patented Oct. 25, 1881.

WITNESSES:
P. C. Dietrich
John E. Kemon

INVENTOR:
J. F. N. Macay
BY
ATTORNEYS.

(No Model.) 2 Sheets—Sheet 2.

J. F. N. MACAY.
FILTER.

No. 248,768. Patented Oct. 25, 1881.

WITNESSES:

INVENTOR:
J. F. N. Macay
BY
ATTORNEYS.

UNITED STATES PATENT OFFICE.

JUAN F. N. MACAY, OF CHARAPOTO, ECUADOR.

FILTER.

SPECIFICATION forming part of Letters Patent No. 248,768, dated October 25, 1881.

Application filed July 1, 1881. (No model.) Patented in England November 29, 1880.

*To all whom it may concern:*

Be it known that I, JUAN FRANCISCO NEPOMUCENO MACAY, of Charapoto, Ecuador, South America, have invented an Improved Apparatus for Filtering, also applicable to dissolving or extracting constituents from minerals or other substances by solvents or chemical agents, of which the following is a specification.

My invention relates to improved apparatus for use in effecting the operations of dissolving solids in liquids and producing chemical reactions, and of filtering or separating liquids from solids in chemical and metallurgical processes, in which a soluble substance or substances, mixed or combined with an insoluble substance or substances, is or are to be dissolved separately or together, wholly or partially, in a given solvent or solvents, and the solution separated by filtration from the undissolved residue.

In effecting the separation of liquid from solid matters by filtration it is of importance to keep the filtering-surface from being clogged by the particles of solid matter, and to present a clear and unobstructed filtering-surface for effecting the rapid separation of the liquid from the solid matters. In the apparatus of my invention this important condition is realized in a very effective manner, the construction and operation of the apparatus being as follows:

Within a cylinder of wood or other material not chemically acted on by the materials treated or the reagents employed is inclosed an inner cylinder of hard wood, or of hard earthenware or stoneware or other material not chemically acted on by the materials treated or the reagents employed, this inner cylinder being perforated with holes and lined internally or externally, but preferably internally, with asbestus-cloth or other suitable filtering material.

Between the inner and outer cylinder there is an annular space, and the inner cylinder is kept in place by longitudinal and circumferential partitions, the former of which divide the annular space into a number of distinct compartments, each provided with a draw-off cock for running off the liquid when separated by filtration. This cylinder is capable of being rotated, and is provided with doors or man-holes in one of the heads, by which the matters to be treated may be introduced and the undissolved residue removed, and the cylinder is also provided with a tubular journal or journals for the introduction of steam, water, air, or other liquids or gases, under pressure or otherwise, which may be blown, forced, or drawn into the annular space for the purpose of keeping the filtering-surface clear, and of acting chemically or mechanically upon the contents of the cylinder. I place within the inner cylinder the ore or other matter to be treated, (previously ground or otherwise reduced to a pulverulent state,) together with the reagents or solvents by which it is to be treated. By imparting rotary motion to the cylinder (the draw-off cocks and man-holes being closed) the solid matters are brought into intimate contact with the solvents or reagents, and by forcing steam, water, air, or other liquids or gases into the space between the inner and outer cylinders, and thence through the filtering medium into the inner cylinder, any solid matters that may adhere to the filtering-surface are disengaged therefrom, whereby the said surface is kept clear, the solid matters are kept in suspension in the liquid, and chemical action, which the liquid or gaseous reagents may be capable of exerting on the said matters, takes place under the most favorable circumstances as regards the intimate mixture of the reagents with the matters and the large surfaces exposed to their action. The annular space between the inner and outer cylinders being divided into compartments by longitudinal divisions, the liquid which passes through into it is carried round by the rotation of the cylinder and flows back into the inner cylinder, thus helping to keep the filtering-surface clear and unobstructed. When the soluble substances are dissolved or chemically acted on, and it is desired to separate the liquid from the solid matters, the draw-off cocks are opened, and then, by giving a slow rotary motion to the apparatus, the liquid may be decanted off from the bulk of the solid matter, and at same time filtered from any such matters which it may hold in suspension by passing through the filtering medium. By this rotary decanting action a practically clear filtering-surface, unobstructed by solid matter, is constantly presented for the liquid to pass through.

Having described the general nature of my invention, I will proceed to describe in detail the construction of the apparatus as illustrated in the accompanying drawings; but I would here observe that although I at present prefer the construction herein represented, I do not limit myself to the details thereof, nor to the use of any particular material, but would select such as would be best adapted to resist the action of the reagents employed in each particular case.

Figure 3:
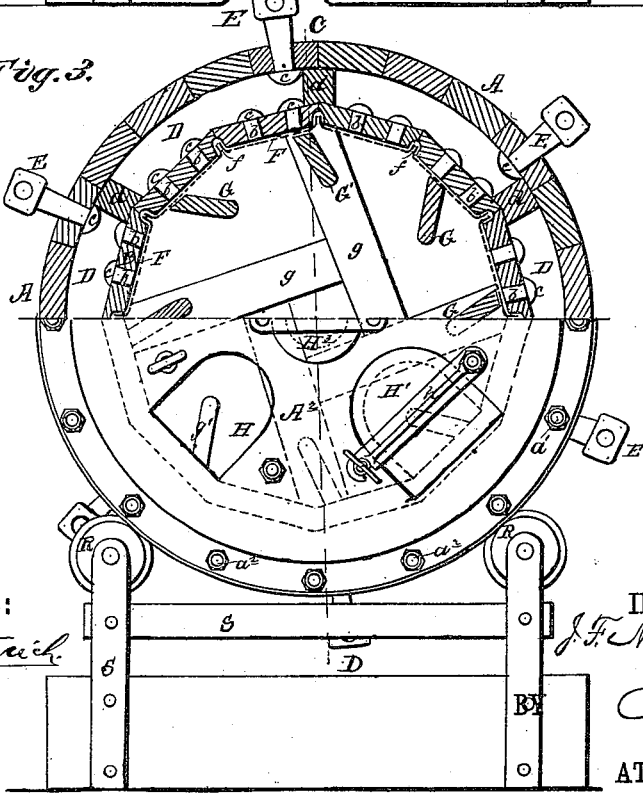
Figure 2:
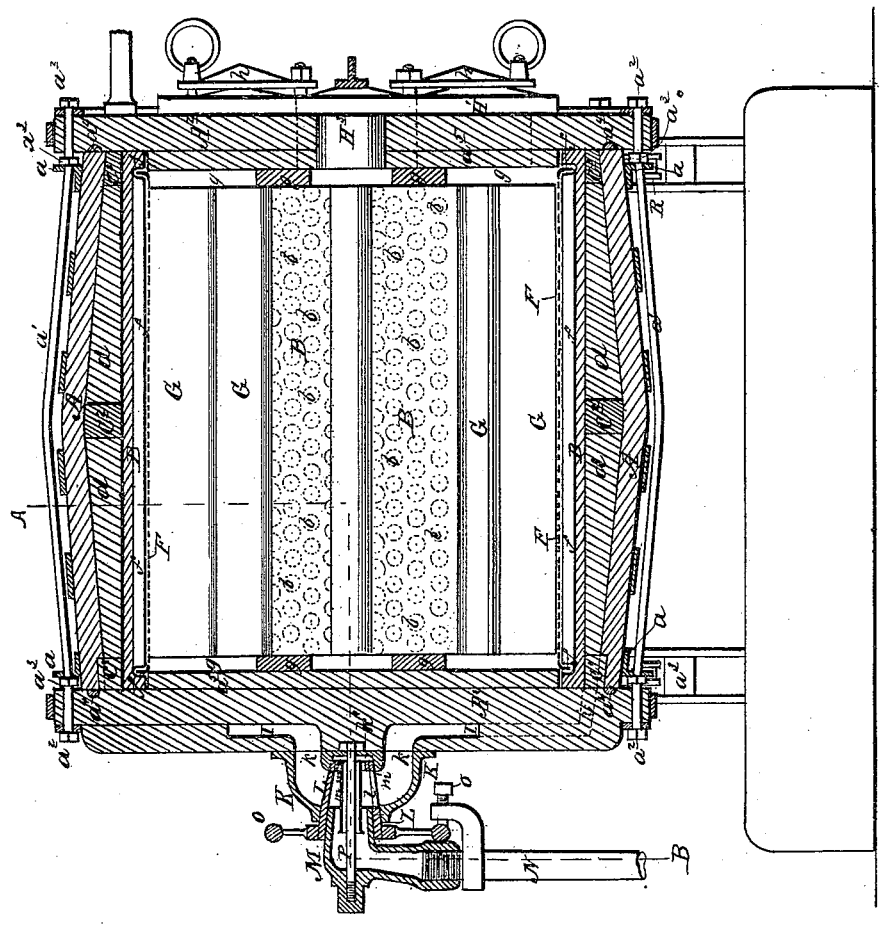

In the drawings, Figure 1 is a rear end elevation of the rotary filter with one-half of the end cover removed and partly in section on line A B, Fig. 2. Fig. 2 is a longitudinal section of the filter on line C D, Figs. 1 and 3. Fig. 3 is a front end elevation with one-half in section through the middle on line E F, Fig. 2.

It is preferred in most cases to construct the filter in the following manner:

A $A'$ $A^2$ is the outer barrel or cylinder, and B is the inner barrel or cylinder. When made of wood the outer cylinder is preferably made of the barrel shape shown, and is built up of a number of staves jointed together and bound by iron hoops, as usual in cask-making.

The end hoops, $a$, are preferably made of angle-iron for another purpose, hereinafter described.

The heads $A'$ $A^2$ are bound with iron hoops, and are tied to the body of the cask by tie-rods $a'$, passing through an iron ring on the face of the head and through the flange of the angle-iron hoops $a$, and are screw-threaded and furnished with nuts $a^2$, which bear against the face of the heads, and with other nuts, $a^3$, which bear against the angle-iron hoops, $a$, so as to draw them tight on the body of the cask and permit of either one or both the heads $A'$ $A^2$ being removed for access to the interior of the filter. A water-tight joint is made between each head and the body of the barrel by an india-rubber ring compressed in a shallow groove in the head, as shown at $a^4$.

The inner cylinder, B, is preferably in the form of a polygonal prism, or it might be a true cylinder, and is placed concentrically within the outer barrel, and is also constructed of staves jointed together and supported by three wooden rings, $C'$ $C^2$ $C^3$, made in segments and fitted within the outer barrel, A. On the inside the ends of the staves butt against a strengthening-lining, $a^5$, fixed to the inside of the heads.

Between the inner and outer barrel there is a space which is divided into segmental compartments D by longitudinal water-tight partitions $d$, which also serve to support the inner cylinder. The compartments at opposite sides of the central ring, $C^2$, communicate by openings $c$ in said ring, and each compartment is furnished with a draw-off cock, E.

The staves of the inner cylinder are perforated with holes $b$, placed as close as possible together, and are covered over the whole internal surface with asbestus-cloth F or other suitable filtering medium. The cloth is secured in place by its edges being calked with asbestus-yarn or asbestus-cloth cuttings into grooves $f$, along the joints of the staves and across the ends thereof. G are dash-boards arranged around the interior of the inner cylinder, and placed, by preference, in the inclined or tangential position shown; but they might be radial or otherwise. Half the number of these dash-boards—i. e., the alternate ones, G—are carried by the arms of end frames, $g$, fitting within the inner cylinder and abutting against the heads. The intermediate dash-boards are carried at one end by the man-hole doors, hereinafter referred to, and fit at the other end in recesses $g'$ in the opposite head of the cylinder. These dash-boards are preferably set at such inclination and distance apart that when the cylinder is rotated in the direction of the arrow $x$ the matters carried round by them will fall from dash-board to dash-board, and so avoid injury to the filtering-cloth by hard substances falling upon it. When rotated in the direction of the arrow $y$ (which would be the ordinary way of revolving it when the solid matters treated have been finely ground) the dash-boards collect the solid and liquid matters, raise and allow the same to drop from a height, thereby insuring their thorough agitation and intimate mixture. The use of these dash-boards is not obligatory. They may be dispensed with in some cases when a less energetic mixing action and a clearer filtrate are required.

The head $A^2$ is provided with man-holes H, preferably four in number, closed by flanged covers $H'$, made water-tight by india-rubber washers and secured by cross-bars $h$, pivoted at one end to the head and secured at the other end by a nut, the covers having a slightly-convex surface, so that the cross-bar shall bear on the center thereof. At the center of the head $A^2$ there is an aperture, closed, when working under pressure, by a similar cover, $H^3$, secured in the same way as the man-hole covers, or left open to permit the escape of air, gases, or liquid blown in, as herein described. The aperture may also be used for charging and as a sight-hole.

The rear head, $A'$, has a number of radial passages, I, on the outside, leading one to each compartment D of the annular space, with which they communicate, by openings $i$, through the head $A'$. These passages I radiate from a central distributing-valve, consisting of an outer shell, K, screwed to the head, an intermediate conical sleeve, L, ground into the outer shell, and an inner tubular plug, M, attached to a supply-pipe, N. The outer shell, K, is in constant communication with all the passages I by ports $k$. The sleeve L has one or more ports, $l$, and is adjusted and fixed in any desired position by a hand-wheel, O, and tightening-screw, $o$. The outer shell, K, revolves upon this sleeve L with the barrel, and thus the radial passages I are brought in succession into communication with the supply-pipe N at any desired point or points of the revolution, so that fluid may be forced into or withdrawn from any of the compartments of the annular space at will, and consequently to or from the inner cylinder through the filtering-surface and through the contents of the barrel or not, as may be required.

The inner tubular plug, M, is ground into the intermediate sleeve, L, and is preferably coned to a rather more acute angle than the latter. The inner plug is carried past the port $l$ of the intermediate sleeve by feathers or ribs $m$, so as to give an all-round port, and terminates at the inner end in a ring, $m'$, received within the intermediate sleeve, L, whose inner end is received in a bearing, R', of the outer shell, the whole being tied together by a central bolt, P. These parts K L M N would be made of metal, unless it be desired to siphon out or exhaust the liquid through them, in which case they would be preferably made of glass or porcelain, if the liquids are liable to act on metals.

The entire filtering-barrel is carried upon grooved rollers R, mounted in a suitable frame or cradle, S, the angle-iron hoops $a$ running in the grooves of the rollers.

The barrel may be revolved by hand or power through suitable gear.

When made of wood I prefer teak or other hard wood for the outer barrel, and pine for the inner barrel and dash-boards.

It will be seen that in the construction of the filter as above described care is taken to avoid the use of any metallic parts within the filter, which is important when the reagents to be employed are of such a nature as to act chemically thereon. For certain purposes, however, both the inner and outer barrels might be made of cast-iron or other metal, and other filtering materials than asbestus-cloth might be used when no reagents are employed which are capable of exerting any chemical action upon such metals or other substances. When the substances treated or the reagents employed are of such a nature that the use of wood or metals is inadmissible the inner and outer barrels might be made wholly or partly of earthenware, which, in the case of small filters, might be molded in one or more pieces, or built up of slabs or staves of earthenware and bound with hoops, as above described.

Having described the nature of my invention and the manner of performing the same, I declare that what I claim as new, and desire to secure by Letters Patent, is—

1. A rotary decanting-filter constructed of an outer barrel or cylinder and an inner perforated shell covered with filtering material, the intervening space being divided into segmental compartments, for use substantially as and for the purposes specified.

2. In a rotary filter, the combination, with the grooved rollers R, of the outer cylinder provided with end angle-iron hoops, $a$, substantially as and for the purpose set forth.

3. In a rotary filter, the combination, with the body A of the outer cylinder, provided with the angle-iron hoops $a$ and the heads A' A$^2$, of the rods $a'$ and nuts $a^2$ and $a^3$, substantially as and for the purpose set forth.

4. In a rotary filter, the combination, with the outer and inner cylinders, of the rings C' C$^2$ C$^3$ and the longitudinal partitions $d$, substantially as and for the purpose set forth.

5. In a rotary filter, the combination, with the outer and inner cylinders, of the compartments D, communicating with each other at the opposite sides of the central ring, C$^2$, and each provided with a cock, substantially as and for the purpose set forth.

6. In a rotary filter, the combination, with the filtering-cloth F, of the cylinder B, formed of perforated staves and provided with grooves at their adjacent edges, substantially as and for the purpose set forth.

7. In a rotary filter, the combination, with the inner cylinder, B, of the dash-boards G G', arranged around the interior of the said cylinder, substantially as and for the purpose set forth.

8. In a rotary filter, the combination, with the inner cylinder, B, of the frame $g$ and the dash-boards G', substantially as and for the purpose set forth.

9. In a rotary filter, the combination, with the compartments D and the outer shell, K, of the radial passages I and openings $i$ in the head A', substantially as and for the purpose set forth.

10. In a rotary filter, the combination, with the head A', provided with the radial passages I and the supply-pipe N, of the shell K, the conical sleeve L, and tubular plug M, substantially as and for the purpose set forth.

11. In a rotary filter, the combination, with the shell K and the plug M, of the sleeve L, provided with posts $l$, the hand-wheel O, and the screw $o$, substantially as and for the purpose set forth.

JUAN FRANCISCO NEPOMUCENO MACAY.

Witnesses:
  WM. CLARK,
    53 *Chancery Lane, London, Patent Agent.*
  T. W. KENNARD,
    *Clerk, 53 Chancery Lane.*